United States Patent [19]

Bandel et al.

[11] Patent Number: 5,371,685
[45] Date of Patent: Dec. 6, 1994

[54] LOW NOISE SEQUENCE OF TREAD ELEMENTS FOR VEHICLE TIRES AND RELATED GENERATION METHOD

[75] Inventors: Paolo Bandel, Milan; Roberto Bergomi, Bresso; Carlo Monguzzi, Monza, all of Italy

[73] Assignee: Pirelli Coordinamento Pneumatici S.p.A., Milan, Italy

[21] Appl. No.: 641,641

[22] Filed: Jan. 15, 1991

[30] Foreign Application Priority Data

Jan. 16, 1990 [IT] Italy .................... 19077 A/90

[51] Int. Cl.$^5$ ............................ G06F 15/46
[52] U.S. Cl. .................. 364/505; 364/574; 364/576; 152/209 R
[58] Field of Search ............ 364/574, 576, 505; 152/209 R, 209 D

[56] References Cited

U.S. PATENT DOCUMENTS

| | | | |
|---|---|---|---|
| 2,006,197 | 6/1935 | Ewart et al. | 152/14 |
| 3,989,780 | 11/1976 | Vorih | 264/40.1 |
| 4,327,792 | 5/1982 | Landers | 152/209 R |
| 4,442,499 | 7/1984 | Sekula et al. | 364/574 |
| 4,474,223 | 10/1984 | Landers | 152/209 R |
| 4,598,748 | 7/1986 | Campos et al. | 152/209 R |
| 4,721,141 | 1/1988 | Collette et al. | 152/209 A |
| 4,777,993 | 10/1988 | Yamashito et al. | 152/209 R |
| 4,788,651 | 11/1988 | Parker et al. | 364/574 |
| 5,062,461 | 11/1991 | Noguchi et al. | 152/209 R |

FOREIGN PATENT DOCUMENTS 3630590 3/1988 Germany.

Primary Examiner—Jack B. Harvey
Assistant Examiner—Hal D. Wachsman
Attorney, Agent, or Firm—Stevens, Davis, Miller & Mosher

[57] ABSTRACT

A tire tread with good noise characteristics according to the invention includes at least one circumference in which a composed sequence of a plurality of design elements, are consecutively disposed in succession. Each design element having varying circumferential lengths, or pitches wherein the pitches are reduced in number, less than or equal to 3 and preferably 2, and are disposed in a random and disordered succession is present. Also disclosed is a design method which generates automatically, in a random or pseudo-random mode, one or more sequences in which the greatest part of the obtained sequences presents good sonorous properties and are selectable across the various characteristic values obtainable from the same sequences.

4 Claims, 4 Drawing Sheets

LOW NOISE SEQUENCE OF TREAD ELEMENTS FOR VEHICLE TIRES AND RELATED GENERATION METHOD

BACKGROUND OF THE INVENTION

A principal object of the present invention is a design elements sequence for tire treads producing limited noise and a related design method. The rolling surface of the tires for road vehicles, or tread, is endowed with a relief conformation, apt to confer to the tread the desired use characteristics, as a balance between road-grip, on dry surface and on wet surface or snowy surface, water elimination, resistance to wear and so on.

To obtain the aforementioned performances the surface of the tread presents in general, transverse grooves with respect to the circumference direction, delimiting full portions, that in the complex have a size, disposition and outline embodied usually in block forms and grooves disposed in one or more circumferential rows, with equal or different space between them, to cover the total width of the tread.

The presence of the blocks and of the grooves however is a source of noise during rolling, due to the periodic contact between the blocks and the road that can result in annoyance for the user. Such noise presents sonorous power characteristics and distribution in different frequencies which are typical of any tread design that generates it at a determined rotation speed.

It is known that with other characteristics being equal it is more acceptable to the listener to hear noise distributed over a large frequency field rather than a concentrated noise in a restricted frequency field.

Tread drawings have therefore been developed that present design elements composed with a groove extending in a transverse direction with respect to the circumference and endowed with a continuous full portion, in a circumferential sense, or more generally by a complex of groove and full portions that repeat with a design geometrically similar, which juxtaposition creates the entire circumference, endowed with different lengths and placed in particular order, in conformity with applicable principles of physics, which are able to generate an identified sonorous sound in extended frequencies in a vast field.

Examples of such tread drawings are disclosed in the U.S. Pat. Nos. 4,327,792 and 4,474,223.

The practice of tread design has shown that the best result is achieved, with the known tread drawings, with the use of a high number of different lengths of the design elements, disposed according to established rules, for example with 4 or 5 different lengths, or pitches.

The realization of many different pitches in a tread is however undesirable, introducing drawbacks of different origin, in particular making the manufacture of the relative molds more complex.

SUMMARY OF THE INVENTION

It has however been discovered, according to the present invention, that distributions of the lengths of the design elements, without any order along the circumference, with a limited number of different pitches, presents a desirable sonorous behavior which is particularly satisfactory and even permits designing in a random method which may be automated.

The scope of the invention is thus to identify the characteristics of a design elements sequence, desirable for forming a tread design, that presents a satisfactory sonorous behavior, including avoiding regular disposition of the different design elements and high numbers of different pitches.

According to an aspect of this invention we have identified some parameters and sizes that allow both to define, and to detect, across the possibilities of some meaningful values, a design elements sequence for a tread of a disordered untidy type, adapted to give desirable low noise characteristics.

According to another aspect of the present invention, we have found that a random or "pseudo-random" method to determine tread elements with a predetermined number of pitch sequences can be combined with a method of selection that considers theaforementioned sizes and their correlations, to design, preferably by means of a computer, an indeterminate number of sequences with good low noise characteristics.

Another object of the present invention is a method for generating a tread pattern for tires having a plurality of design elements, (design cycles) each one comprising in a circumferential sense a full portion and an adjacent groove having a transverse component with respect to the rolling direction of the tread, consecutively disposed in succession along a circumference, the measure "$\lambda$" in the circumferential sense of the design element being called the pitch, the characterized in that it includes the phases of:

a) choosing a design elements ensemble comprising elements having a number n of different pitches, the number of the elements being such that the sum of all the element pitches of the ensemble realizes the circumference of the tread;

b) generating at least one disordered succession of the design elements;

c) verifying that the generated succession(s) do(es) not correspond to any order rules of the pitch sequence and discarding possible regular successions;

d) calculating the entropy and the maximum Normalized Amplitude of the spectrums associated with the generated sequences;

e) accepting one or more of the generated sequences for which the entropy is maximum and the calculated Normalized Amplitude is minimum.

Preferably the number n of different pitches (design cycles) is n<3 and more preferably the number n of different pitches is n=2.

Conveniently the ratio between the greatest pitch and the minimum pitch is $\lambda_{max}/\lambda_{min} > 1.3$ and preferably $>1.4$.

The operation to generate at least one disordered succession of the design elements, directly chosen from the elements ensemble, is executed with random or pseudo-random generation of an algorithm by means of a computer.

The operation of verifying that the generated successions do not correspond accidentally with order rules of the pitch sequence includes the phases of:

a) individualizing in the generated disordered succession or successions, irregular homogeneous segments formed of the design elements, in which each homogeneous segment is composed of an entire number m of design elements having the same pitch;

b) verifying that in the generated succession, or at least in one of the generated successions, the number m of elements forming a homogeneous segment is $m \leq 5$;

the number $R_r$ of the groups of homogeneous segments that is repeated in the sequence (that is to say identical in any position of the circumference, even in partial overlap with other groups) is, in relation to the number n of provided different pitches:

*$R_r \leq n \times 5$ for consecutive groups of 2 homogeneous segments;

*$R_r \leq n$ for consecutive groups of 3 homogeneous segments;

*$R_r = 0$ for consecutive groups of more than 3 homogeneous segments.

In a particular embodiment the method according to the invention provides that, to generate at least one disordered succession of design elements, the design elements of the ensemble are grouped in disorder to form more homogeneous segments, in which each homogeneous segment is composed of an entire number m ($m \leq 5$) of elements having the same pitch, which homogeneous segments are disposed in sequence, in disordered mode, to form a disordered succession of the homogeneous segments.

The grouping operation in disordered mode of the design elements of the ensemble to form the homogeneous segments and the disposition of the homogeneous segments in sequence is conveniently executed by a random or pseudo-random generation algorithm by means of a computer.

Similarly, an object of the present invention is a tire having tread with a plurality of design elements, each comprising a full portion and an adjacent groove having a transverse component to the rolling direction of the tread, geometrically similar between them, consecutively disposed in succession along a circumference, the circumferential measure "$\lambda$" of a design element being called pitch, characterized in that n different pitches are present the design elements form homogeneous segments $<m,\lambda>_j$, composed of m consecutive elements of equal pitch $\lambda$, aligned in succession, wherein m is less than 5;

the number $R_r$ of homogeneous segments groups that repeats in the sequence, even in partial overlap with other groups, is, in relation to the number n of present different pitches:

*$R_r \leq n \times 5$ pk for groups of 2 consecutive homogeneous segments;

*$R_r \leq n$ for groups of 3 consecutive homogeneous segments,

*$R_r = 0$ for groups of more than 3 consecutive homogeneous segments.

Conveniently in the tire according to invention the different pitches number is: $n \leq 3$.

The ratio $\lambda_{max}/\lambda_{min}$ between the maximum and the minimum of the present pitches is: $\lambda_{max}/\lambda_{min} > 1.3$.

In a preferred form of the present invention, two different pitches ($\lambda_1/\lambda_2$), satisfying $\lambda_1/\lambda_2$ greater than 1.4, are present.

BRIEF DESCRIPTION OF THE DRAWINGS

More details can be appreciated with the following description, with reference to the accompanying drawings, in which.

DETAILED DESCRIPTION OF THE DRAWINGS

Figure 1:
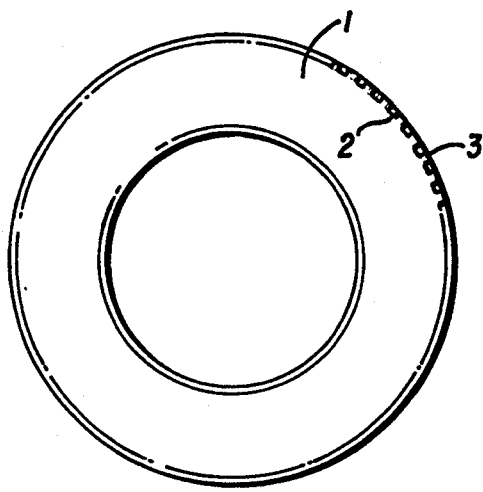
FIG. 1 shows the lateral view of a tire, showing schematic reliefs and grooves of the tread.

As schematically shown in FIG. 1, the rolling surface 1 of a tire, or tread, is endowed with a plurality of grooves or recesses 2, disposed according to an adapted design, able to provide the tire with the desired road-grip property during operation, even in unfavorable adherence conditions.

A full portion, or block, 3 is delimited between two of such grooves or recesses disposed consecutively along an intermediate circumference. This is further illustrated in FIG. 2, where a short tread portion is shown developed in a plane.

A design element P includes a block and an adjacent groove, or, more generally, a complex of grooves and blocks that repeats in a geometrically similar design along a circumference; the resulting circumference of the tread on each parallel plane composed of a total number N of design elements.

Each design element has a circumferential length, called pitch and designated with $\lambda$.

In the same tire, for different exigencies, we can have one or more parallel planes with different numbers N of design elements, and different sequences.

To obtain good noise behavior during rolling, the design of the tread generally includes a plurality of different pitches $\lambda_1, \lambda_2, \ldots$.

Defining $N_i$ = number of elements with the same $\lambda_i$, it results that the measure of the circumference of the tread is:

$$C = \Sigma^n_{i=1} N_i \times \lambda_i$$

According to the prior art, opportune choices of the succession of the pitches, usually respecting particular orders, generally allow satisfactory sonorous behaviors to be obtained.

According to the invention, we discovered that with a limited number of different pitches, not more than 3, and with a random succession of the same pitches, or generated with a random method, it is possible to obtain optimal sonorous behaviors, that are generally better, and not lower than those of known regular sequences.

In particular the realization of pitch sequences according to the invention is conveniently realized by associating the chosen pitches, in the ambit of a preconstituted set of pitches, to a randomly or pseudo-randomly generation algorithm by a computer, which can automatically give one or more sequences that can then be examined so as to select the best sonorous solution among them or the best on the grounds of other design characteristics.

The random generation, on the grounds of known probability laws gives, in general, a disordered succession of pitches; because we maintain that the good obtained behavior is connected to the presence of such disorder in the succession, the random successions can be furthermore analyzed to verify the real state of the "disorder" and eliminate sequences that, even with low probability, are regularly ordered.

The analysis of the state of disorder can be executed by any method, for example, verifying the absence of particular rules in the sequence, like those described in the cited known patents or similar other known rules.

A convenient check method of the state of disorder can be the following rules, that provide limitation of the number of repetitions of pitch groups and limitation of regular variations, which are particularly monotonous, of the length of the same pitches.

Figure 2:
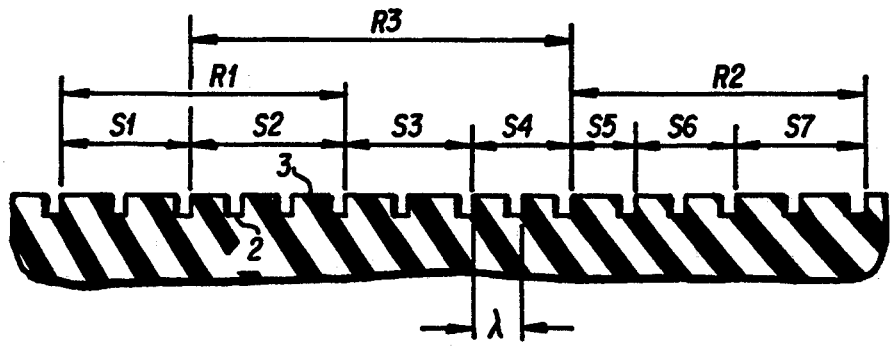
FIG. 2 shows an enlarged portion of tread, developed along a longitudinal section.

According to the present invention, we individualize in the generic tread design, more groups of design elements of equal pitches placed consecutively; each of them is called homogeneous segment $S<m,\lambda>_j$ and it is indicated in FIG. 2 with $S_1, S_2, \ldots S_j, \ldots S_t$, wherein m is the entire number of consecutive elements having equal length $\lambda$ and j indicates the position of the homogeneous segment in the total sequence of homogeneous segments that realizes the design of the tread.

Every design element is attributed to a homogeneous segment and so the circumference C of the tread can be defined as:

$$C = \Sigma^t_{j=1} s_j = \Sigma_{j=1}{}^t (m \times \lambda)_j$$

in which t is the present homogeneous segments number and $S_j$ is the length of the segment $S_j$.

Then in the circumference groups R of consecutive homogeneous segments are individualized, composed of the succession of an arbitrary number of contiguous homogeneous segments, in the order in which they are disposed observing the circumference with a certain path direction. For example, FIG. 2 shows a group $R_1$, composed with two homogeneous segments, and a group $R_2$ with three homogeneous segments; $R_3$ is an other group, partially superposed to $R_1$ and comprising three homogeneous segments.

Preferably the ratio between the maximum pitch and minimum pitch is more than 1.4.

Next, we define a homogeneous segments ensemble $<m,\lambda>_j$, grouping the design elements of the used ensemble as described; the aligned homogeneous segments compose the complete design of the tread.

The maximum number m of equal design elements forming a homogeneous segment is less than an established value and preferably lower than 5.

With the defined homogeneous segments ensemble we can build a sequence forming the design of the tread, in which the homogeneous segments are disposed in succession, imposing the following conditions:

the above-defined number $R_r$ of homogeneous segments groups that are repeated in the sequence, namely that is founded identical in any position of the circumference, even in partial overlap with other groups, is, in relation to the number n of provided different pitches:

\*$R_r \leq n \times 5$ for groups of 2 consecutive homogeneous segments;

\*$R_r \leq n$ for groups of 3 consecutive homogeneous segments;

\*$R_r = 0$ for more than 3 homogeneous segments consecutive groups.

By homogeneous segments group we mean any homogeneous segments group, disposed consecutively in the sequence, according to the order that they have in the same sequence, even partially superposed among them; the position of the group in the sequence and its extension, namely the homogeneous segments number that includes, are arbitrary, namely the imposed conditions shall be verified for any, however chosen group.

The imposed conditions intend to exclude, or limit, the presence of repetition and regular variation in the length of the design elements along the circumference.

To evaluate the efficacy of the process according to the invention, we calculated, in random mode, as previously defined, more sequences and we compared them with corresponding reference sequences having good sonorous behavior, realized on the grounds of the prior art.

To individualized the characteristics of the examined sequences a sequence sonorous spectrum was defined, attributing to each element a arbitrary noise amplitude, but equal for all the pitches, and of length proportional to the pitch itself; the single noises are superposed in deal with the examined sequence, obtaining a periodic function, having for basic wave the circumference of the tread.

To such function we applied Fourier transforming, obtaining a spectrum of amplitudes in function of the wave lengths, submultiple of the basic wave length. Namely the "harmonics" of said basic wave length.

As the amplitude of the noise attributed to the blocks is arbitrary, it is convenient for the scopes of the evaluation of the obtained result to make the amplitudes of the spectrum scaler, considering the "Normalized Amplitudes" defined as $$A_{Ni} = \frac{A_i}{\sqrt{\Sigma_j A_j^2}}.$$

On the grounds of the individualized sonorous spectrum, the entropy can be calculated with the formula:

$$I = E/E'$$

In which:
$E = \log_2(A) - B/A$ $E' = \log_2(N)$ (maximum entropy, corresponding with a spectrum of white noise)

$A = P(1) + P(2) + \ldots + P(i) + \ldots + P(n)$ $B = P(1) \log_2(P(1)) + P(2) \log_2(P(2)) + P(i) \log_2(P(i)) + \ldots + P(n) \log_2(P(n))$ P(i) = density of the spectrum of the power of harmonic "i" n = number of harmonics.

For "white noise", as known in the field, we mean noise with constant energy for each frequency in the interested field of the sonorous spectrum. A more detailed description of which can be found in Stanford Goldman, "INFORMATION THEORY", from Prentice-Hall, Inc. N.Y.

The entropy, so calculated, is an index of good sonorous behavior and thus the best sequences with respect to the noise are among those that present high entropy.

Good sonorous behavior is determined, furthermore, by a low value of the maximum Normalized Amplitude of the spectrum and thus the best sequences can be found by high entropy values untidily to minimum values of maximum amplitudes.

The generated and examined sequences had the following common characteristics:
Total number of elements: 66
Ratio $\lambda_{max}/\lambda_{min}$: 1.45
Range of harmonics considered for the entropy evaluation and Normalized Amplitude: from 1st to 99th harmonic.

For reference sake, we have calculated "regular" sequences for tread patterns exhibiting low noise, substantially on the grounds of the teachings of the U.S. Pat. No. 4,474,223, using two and three pitches, with the aforementioned common characteristics; and we have calculated the entropy and the maximum Normalized Amplitude for them.

In the table the results of the respective tests are detailed.

We calculated 1000 random sequences for two pitches and 1000 random sequences for three pitches.

For such sequences we calculated the entropy and the maximum Normalized Amplitude, as indicated in the table.

For the obtained random sequences, we furthermore verified their correspondence to the prescribed disorder rules, and the result of the check is shown in the table.

Figure 3:
FIG. 3 shows a diagram of a design elements sequence of a tread example according to the invention, in which the abscissa indicates the position in the sequence of the design elements and the ordinate indicates the value of the pitch of each element represented.
Figure 4:
FIG. 4 shows a diagram of a design elements sequence of a second tread example according to the invention.
Figure 7:
FIG. 7 shows a diagram of a design elements sequence in a tread of regular type, according to prior art.
Figure 5:
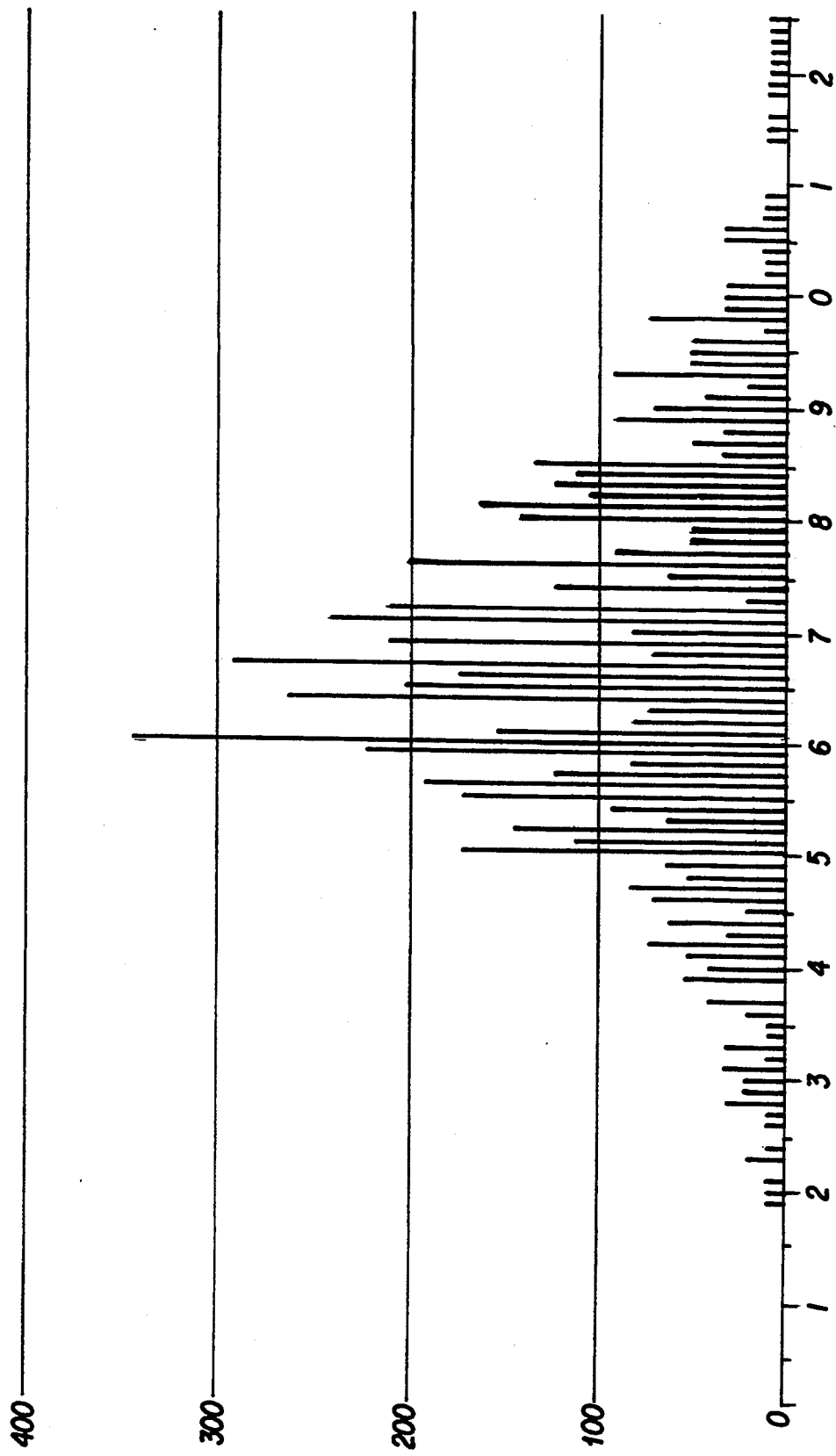
FIG. 5 shows the spectrum of the Normalized sonorous Amplitudes of the different harmonics associated with the design of the tread of FIG. 3.
Figure 6:
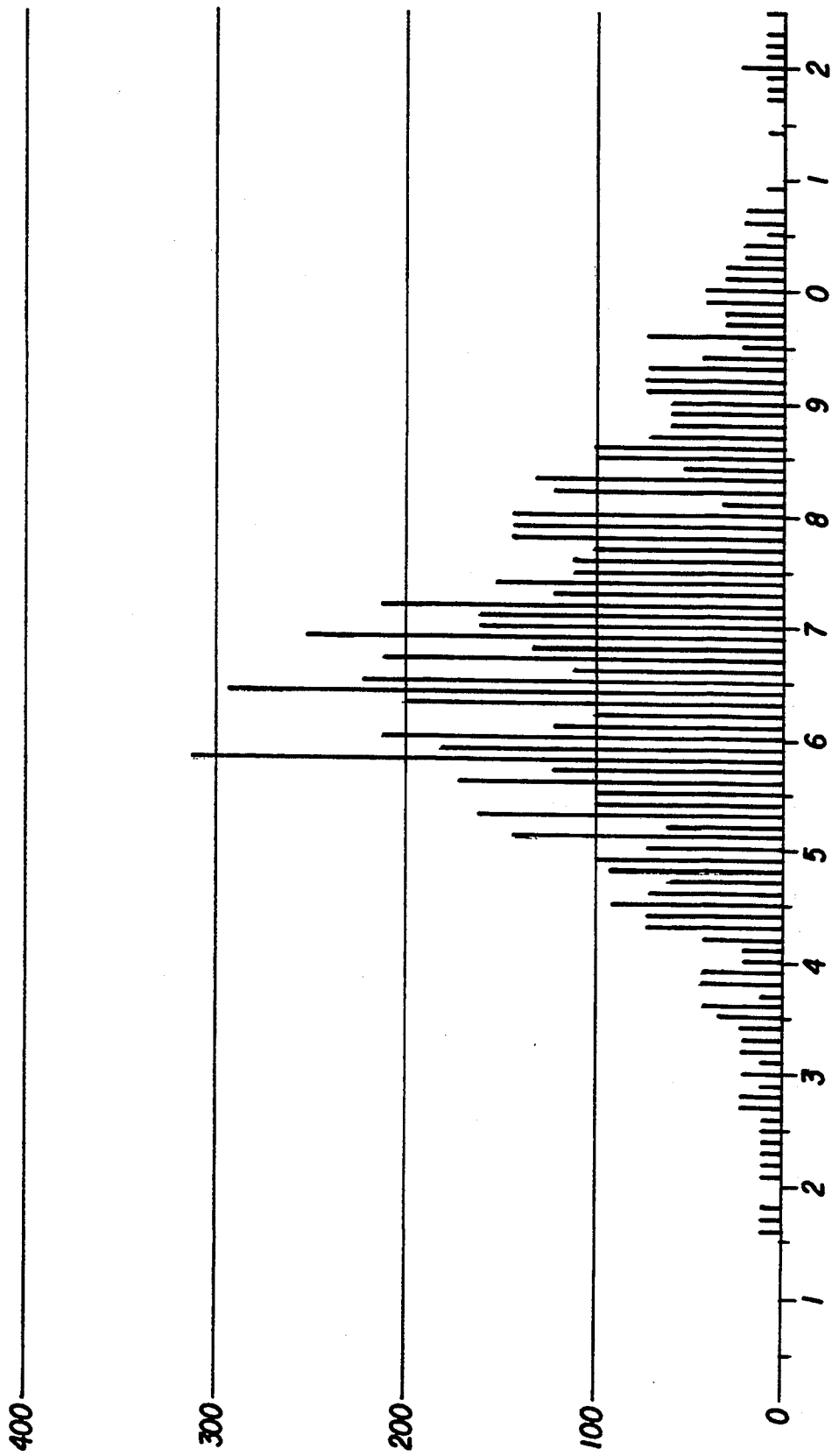
FIG. 6 shows the spectrum of the Normalized sonorous Amplitudes of the different harmonics, associated with the design of tread of FIG. 4.
Figure 8:
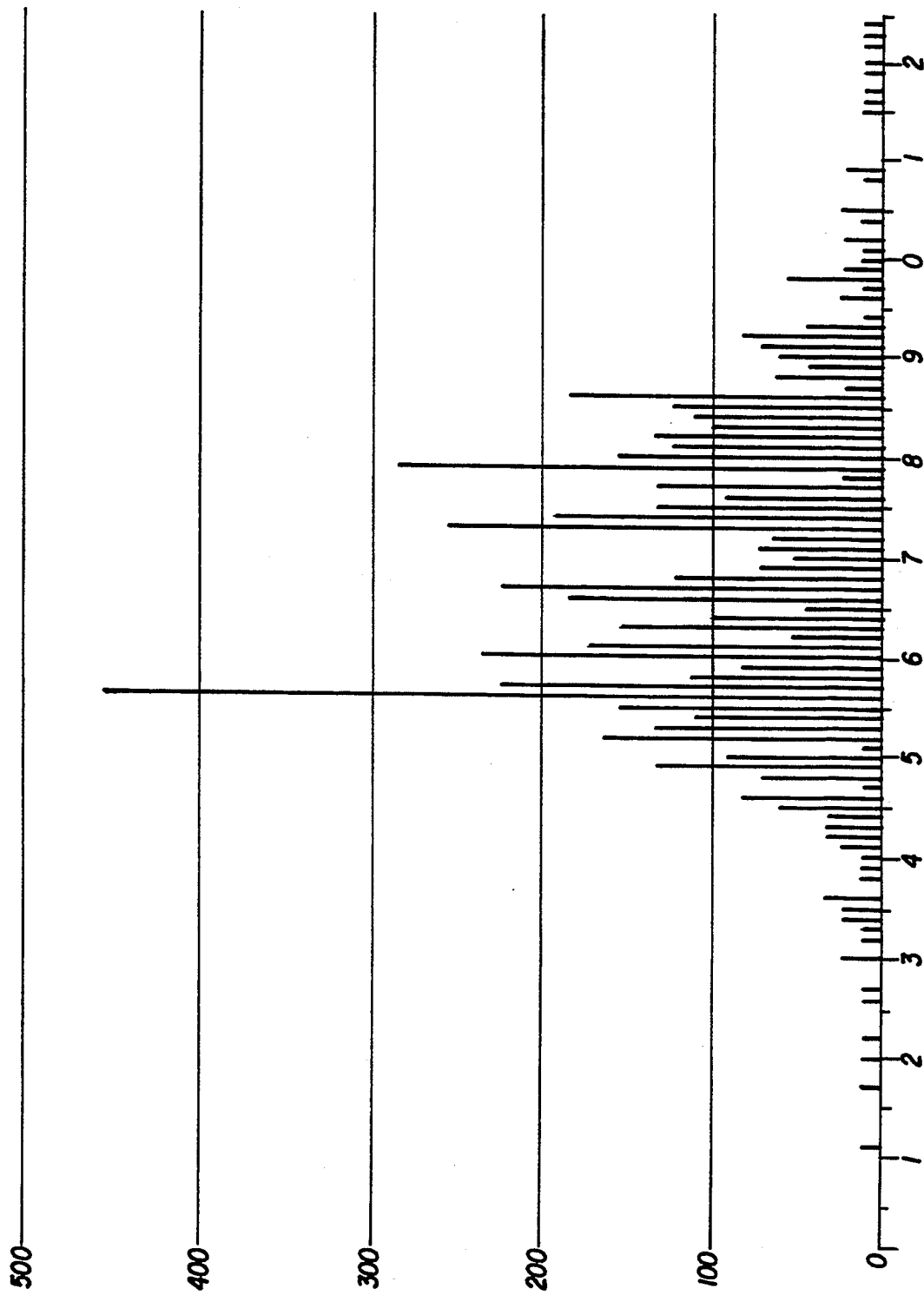
FIG. 8 shows the spectrum of the Normalized sonorous Amplitudes of the different harmonics, associated with the design of the tread of the diagram represented in FIG. 7.

FIGS. 3, 4 show two random sequences, for two pitches, according to the invention, chosen between those calculated and the FIGS. 5, 6 represent the corresponding spectrums of the Normalized Amplitudes; the comparison of FIG. 7 shows a regular type sequence for two pitches and in FIG. 8 the corresponding spectrum of the Normalized Amplitudes is represented.

As shown in the results in the table, 96% of the sequences with two pitches have revealed to be better than the corresponding reference sequence, both as to entropy, and as to the value of the maximum Normalized Amplitude, namely they show higher entropy and lower Normalized maximum Amplitude than the ordered comparison sequence.

In the case of sequences with three pitches, 20% of the random sequences are better than the corresponding comparison sequence.

As we can observe, the random sequences have supplied better results in general than the ordered sequences and better results, both in terms of high entropy and reduced maximum Amplitude, are obtained with sequences of two pitches, while in the case of ordered sequences a tendency is observed to have better behavior for the sequences with a higher pitch number.

So, according to the invention it is possible to realize tread drawings of optimal noise characteristics using sequences that include successions of a reduced number of different pitches, and preferably two different pitches, with relevant advantages in the production outfits.

In addition to this, the design method of the present invention is able to automatically generate one or more adapt sequences to the scope, with negligible discard cases.

This allows both to generate, in a particularly easy mode, satisfactory design characteristics and to easily dispose of a high number of automatically generated test sequences, in order to select between them with checks, the sequences that better adapted to the use to which they are destined. This accomplished, for example, by calculating and comparing the entropy values and maximum Amplitude described in precedence, or on the grounds of other characteristics or exigencies. Therefore obtaining a product in which the research for good noise characteristics does not sensitively condition the liberty of selection of the remaining properties of the design.

In particular, contrary to what is proposed by the prior art, with the use of the method of the present invention it is possible to obtain tread patterns of good sonorous behavior with two different pitches only, without being obliged to adopt a high number of pitches to reach this objective and thus introducing a sensible simplification in the design procedures and in the realization of the production outfits.

The presence in a tread design of the disorder characteristics individualized by the present invention, indicative of the random sequences, furthermore allows to detect rapidly, before a design is defined on the grounds of other design exigencies, its noise efficacy, so as to obtain meaningful indications to the scopes of drawing particular design developments or similar.

Moreover, different variants can be introduced, without having to exit from the ambit of the present invention in its General characteristics; in particular different check methods of the disorder condition of a sequence can be adopted, for example on the grounds of the specific characteristics of the examined tread, which are equivalent to a proposed one and allow, in analog mode, to individualized the substantial "randomess" of the sequences under examination and, with it, their efficacy, according to the invention, to noise.

| EXAMINED SEQUENCES | | |
|---|---|---|
| Pitches number | 2 pitches | 3 pitches |
| N° of provided random sequences | 1000 | 1000 |
| N° of valid sequences | 599 (59.9%) | 893 (89.3%) |
| Entropy | 0.669 ÷ 0.785 | 0.623 ÷ 0.748 |
| Max. Normalized Amplitude | 258.2 ÷ 485.8 | 273.1 ÷ 548.7 |
| N° of invalid sequences | 401 (40.1%) | 107 (10.7%) |
| Entropy | 0.679 ÷ 0.785 | 0.609 ÷ 0.741 |
| Max. Normalized Amplitude | 255.9 ÷ 495.0 | 279.5 ÷ 594.2 |
| Regular sequence of reference | | |
| Entropy | 0.707 | 0.702 |
| Max. Normalized Amplitude | 452.4 | 345.1 |
| N° of valid random sequences better than the reference | 580 (96.8%) | 176 (19.7%) |
| N° of invalid random sequences better than the reference | 381 (95.0%) | 24 (22.4%) |

By valid sequences we mean generated sequences in random mode, corresponding to the described disorder rules.

We claim:
1. A tire having tire treads comprising:
load-bearing elements and grooves which are generally transverse and adjacent to said load-bearing elements, said elements and grooves being distributed over a circumference of said tire in a design pattern including repetitive design cycles having variable pitch;
said design pattern satisfying the conditions that:

(i) the number of homogeneous segment groups formed by two homogeneous segments is less than or equal to $5 \times n$, wherein n is a number of different design cycles that are used in the design pattern;

(ii) the number of homogeneous segment groups formed by three homogeneous segments is less than or equal to n; and (iii) no homogeneous segment group formed by more than three homogeneous segments is repeated in the design;

wherein a homogeneous segment is defined as a group of m adjacent design cycles having equal pitch, wherein m is an integer less than or equal to 5, and a homogeneous segment group is defined as a succession formed by an arbitrary number of adjacent homogeneous segments.

2. A tire according to claim 1, wherein $n \leqq 3$.

3. A tire according to claim 1, wherein a ratio between the pitch of the design cycle having the greatest pitch and the pitch of the design cycle having the minimum pitch is $\lambda_{max}/\lambda_{min} > 1.3$.

4. A tire according to claim 3, wherein $\lambda_{max}/\lambda_{min} > 1.4$.

* * * * *